United States Patent
Rosa et al.

(10) Patent No.: US 9,516,627 B2
(45) Date of Patent: Dec. 6, 2016

(54) INTER-SITE CARRIER AGGREGATION

(75) Inventors: Claudio Rosa, Randers (DK); Chunli Wu, Beijing (CN); Woonhee Hwang, Espoo (FI); Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 114 days.

(21) Appl. No.: 14/377,554

(22) PCT Filed: Feb. 10, 2012

(86) PCT No.: PCT/EP2012/052329
§ 371 (c)(1),
(2), (4) Date: Aug. 8, 2014

(87) PCT Pub. No.: WO2013/117239
PCT Pub. Date: Aug. 15, 2013

(65) Prior Publication Data
US 2015/0003418 A1    Jan. 1, 2015

(51) Int. Cl.
H04W 72/04 (2009.01)
H04L 5/00 (2006.01)
H04W 36/00 (2009.01)
H04W 74/08 (2009.01)

(52) U.S. Cl.
CPC .......... *H04W 72/0406* (2013.01); *H04L 5/001* (2013.01); *H04L 5/006* (2013.01); *H04L 5/0035* (2013.01); *H04L 5/0098* (2013.01); *H04W 36/0005* (2013.01); *H04W 74/0833* (2013.01); *H04L 5/0044* (2013.01)

(58) Field of Classification Search
CPC .............. H04W 36/0005; H04W 36/0066; H04W 76/02; H04W 76/046; H04W 74/0833; H04W 72/0406
See application file for complete search history.

(56) References Cited

U.S. PATENT DOCUMENTS

| | | | | |
|---|---|---|---|---|
| 8,861,452 B2* | 10/2014 | Barbieri | ............... | H04W 48/10 370/329 |
| 2010/0215011 A1* | 8/2010 | Pan et al. | ....................... | 370/329 |
| 2011/0294508 A1* | 12/2011 | Min et al. | ..................... | 455/436 |
| 2011/0312316 A1* | 12/2011 | Baldemair et al. | ......... | 455/422.1 |
| 2012/0087257 A1* | 4/2012 | Larsson | .................. | H04L 5/001 370/252 |
| 2012/0140743 A1* | 6/2012 | Pelletier et al. | .............. | 370/335 |

(Continued)

FOREIGN PATENT DOCUMENTS

WO    WO 2011021595 A1 *    2/2011
WO    WO 2012/136269 A1    10/2012

OTHER PUBLICATIONS

3GPP TSG-RAN WG2 Meeting #70bis, Stockholm, Sweden, Jun. 28-Jul. 2, 2010, R2-104195, "Corrections and new Agreements on Carrier Aggregation", Nokia Siemens Networks (Rapporteur), 15 pgs.

*Primary Examiner* — Benjamin H Elliott, IV
(74) *Attorney, Agent, or Firm* — Harrington & Smith

(57) ABSTRACT

The invention relates to an apparatus including at least one processor and at least one memory including a computer program code, the at least one memory and the computer program code configured to, with the at least one processor, cause the apparatus at least to: convey a radio resource reconfiguration message to a user device for carrying out secondary cell configuration for downlink data conveyance using inter-site carrier aggregation functionality, and obtain and/or convey information on completion of the secondary cell configuration and/or activate downlink data forwarding to a secondary cell node.

32 Claims, 4 Drawing Sheets

(56) References Cited

U.S. PATENT DOCUMENTS

Figure 1:
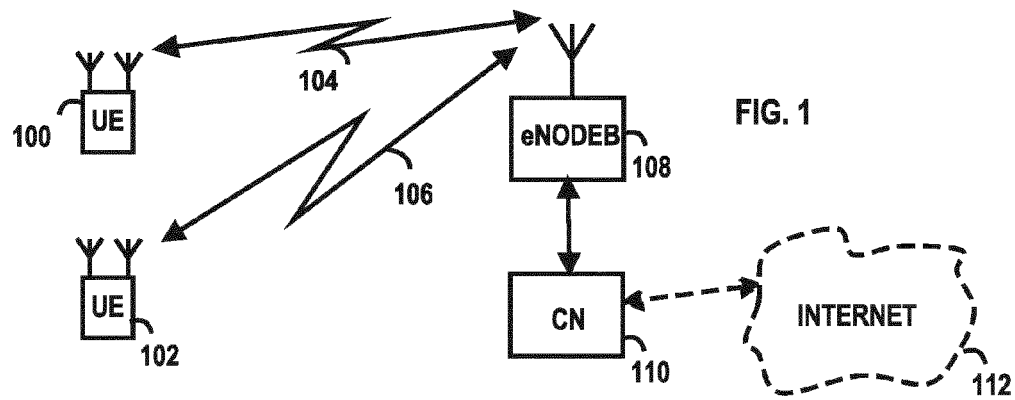

| | | | |
|---|---|---|---|
| 2012/0142354 A1* | 6/2012 | Ahluwalia | 455/436 |
| 2012/0281548 A1* | 11/2012 | Lin et al. | 370/242 |
| 2012/0281600 A1* | 11/2012 | Tseng et al. | 370/280 |
| 2012/0314569 A1* | 12/2012 | Liu et al. | 370/230 |
| 2012/0327821 A1* | 12/2012 | Lin et al. | 370/280 |
| 2013/0083739 A1* | 4/2013 | Yamada | 370/329 |
| 2013/0188473 A1* | 7/2013 | Dinan | 370/216 |
| 2013/0188580 A1* | 7/2013 | Dinan | 370/329 |
| 2014/0023015 A1* | 1/2014 | Frederiksen | H04L 5/001 370/329 |
| 2014/0045494 A1* | 2/2014 | Pekonen | H04W 36/0005 455/434 |
| 2015/0003381 A1* | 1/2015 | Dinan | 370/329 |
| 2015/0003418 A1* | 1/2015 | Rosa et al. | 370/331 |

\* cited by examiner

INTER-SITE CARRIER AGGREGATION

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

A heterogeneous network typically comprises different types of base station nodes. As an example, such a network may comprise macro-(e)NodeBs and pico-(e)NodeBs. When a user device is in the coverage area of both a larger umbrella cell and a small cell, it may be beneficial in some cases to exploit both network layers for transmission to the user device. In such a case, a data stream is split to be transmitted via both the umbrella cell node and the small cell node on separate component carriers.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: convey a radio resource reconfiguration message to a user device for carrying out secondary cell configuration for downlink data conveyance using inter-site carrier aggregation functionality, and obtain and/or convey information on completion of the secondary cell configuration and/or activate downlink data forwarding to a secondary cell node.

According to an aspect of the present invention, there is provided an apparatus comprising: at least one processor and at least one memory including a computer program code, the at least one memory and the computer program code configured to, with the at least one processor, cause the apparatus at least to: obtain information on completion of a secondary cell configuration from a primary node or a user device and/or downlink data from the primary node for downlink data conveyance using inter-site carrier aggregation functionality, and carry out a random access channel procedure for enabling switching to the configured secondary cell.

According to an aspect of the present invention, there is provided an apparatus comprising: at least one processor and at least one memory including a computer program code, the at least one memory and the computer program code configured to, with the at least one processor, cause the apparatus at least to: carry out a random access channel procedure for enabling switching to a configured secondary cell for downlink data conveyance using inter-site carrier aggregation functionality, and/or carry out a non-contention based random access channel procedure for obtaining uplink timing for downlink data conveyance using inter-site carrier aggregation functionality.

According to yet another aspect of the present invention, there is provided a method comprising: conveying a radio resource reconfiguration message to a user device for carrying out secondary cell configuration for downlink data conveyance using inter-site carrier aggregation functionality, and obtaining and/or convey information on completion of the secondary cell configuration and/or activating downlink data forwarding to a secondary cell node.

According to yet another aspect of the present invention, there is provided a method comprising: obtaining information on completion of a secondary cell configuration from a primary node or a user device and/or downlink data from the primary node for downlink data conveyance using inter-site carrier aggregation functionality, and carrying out a random access channel procedure for enabling switching to the configured secondary cell.

According to yet another aspect of the present invention, there is provided a method comprising: carrying out a random access channel procedure for enabling switching to a configured secondary cell for downlink data conveyance using inter-site carrier aggregation functionality, and/or carrying out a non-contention based random access channel procedure for obtaining uplink timing for downlink data conveyance using inter-site carrier aggregation functionality.

According to yet another aspect of the present invention, there is provided an apparatus comprising: means for conveying a radio resource reconfiguration message to a user device for carrying out secondary cell configuration for downlink data conveyance using inter-site carrier aggregation functionality, and means for obtaining and/or convey information on completion of the secondary cell configuration and/or means for activating downlink data forwarding to a secondary cell node.

According to yet another aspect of the present invention, there is provided an apparatus comprising: means for obtaining information on completion of a secondary cell configuration from a primary node or a user device and/or downlink data from the primary node for downlink data conveyance using inter-site carrier aggregation functionality, and means for carrying out a random access channel procedure for enabling switching to the configured secondary cell.

According to yet another aspect of the present invention, there is provided an apparatus comprising: means for carrying out a random access channel procedure for enabling switching to a configured secondary cell for downlink data conveyance using inter-site carrier aggregation functionality, and/or means for carrying out a non-contention based random access channel procedure for obtaining uplink timing for downlink data conveyance using inter-site carrier aggregation functionality.

According to yet another aspect of the present invention, there is provided a computer program embodied on a computer-readable storage medium, the computer program comprising program code for controlling a process to execute a process, the process comprising: conveying a radio resource reconfiguration message to a user device for carrying out secondary cell configuration for downlink data conveyance using inter-site carrier aggregation functionality, and obtaining and/or convey information on completion of the secondary cell configuration and/or activating downlink data forwarding to a secondary cell node.

According to yet another aspect of the present invention, there is provided a computer program embodied on a computer-readable storage medium, the computer program comprising program code for controlling a process to execute a process, the process comprising: obtaining information on completion of a secondary cell configuration from a primary node or a user device and/or downlink data from the primary node for downlink data conveyance using inter-site carrier aggregation functionality, and carrying out a random access channel procedure for enabling switching to the configured secondary cell.

According to yet another aspect of the present invention, there is provided a computer program embodied on a computer-readable storage medium, the computer program comprising program code for controlling a process to execute a process, the process comprising: carrying out a random access channel procedure for enabling switching to a configured secondary cell for downlink data conveyance using inter-site carrier aggregation functionality, and/or carrying out a non-contention based random access channel procedure for obtaining uplink timing for downlink data conveyance using inter-site carrier aggregation functionality.

LIST OF DRAWINGS

Figure 2:
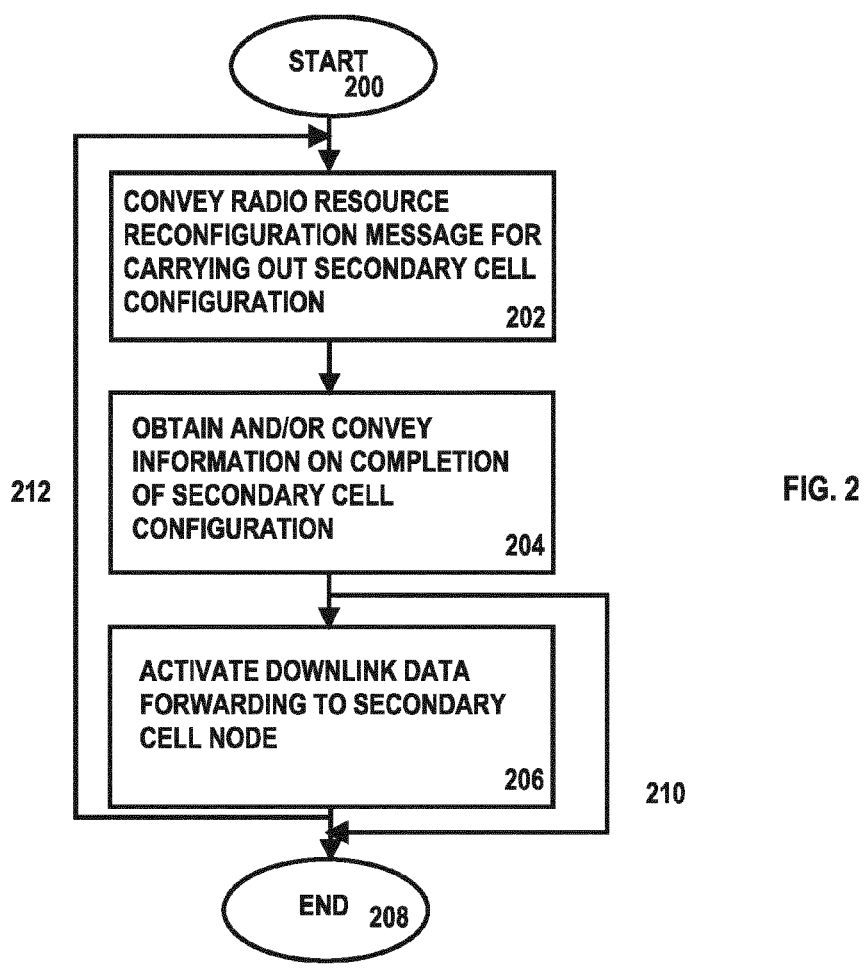
Figure 3:
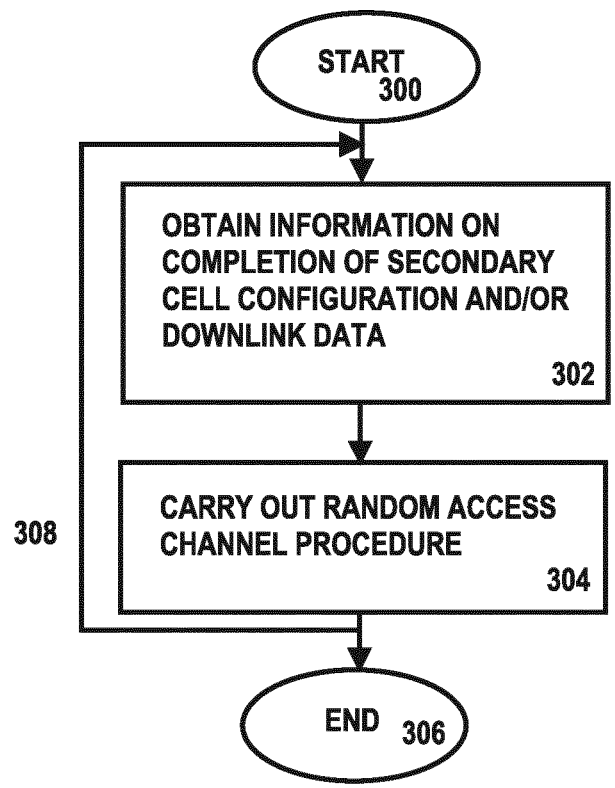
Figure 4:
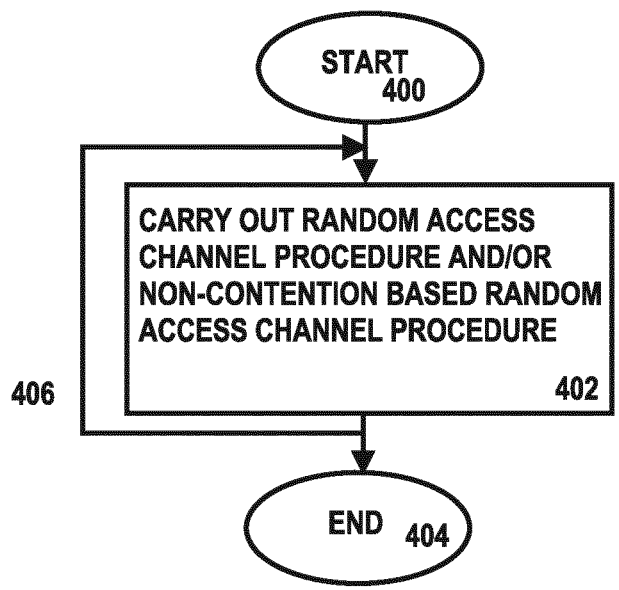
Figure 5:
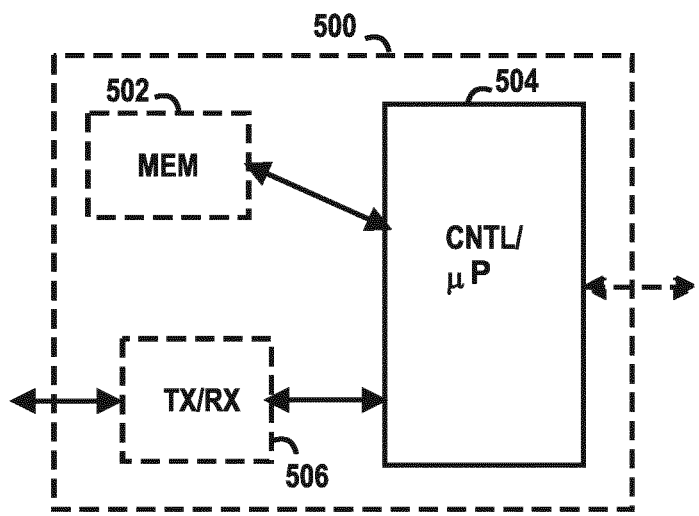
Figure 6:
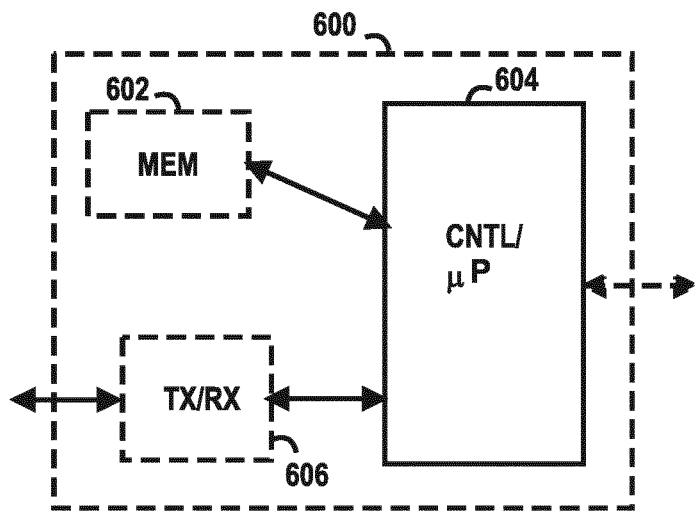
Figure 7:
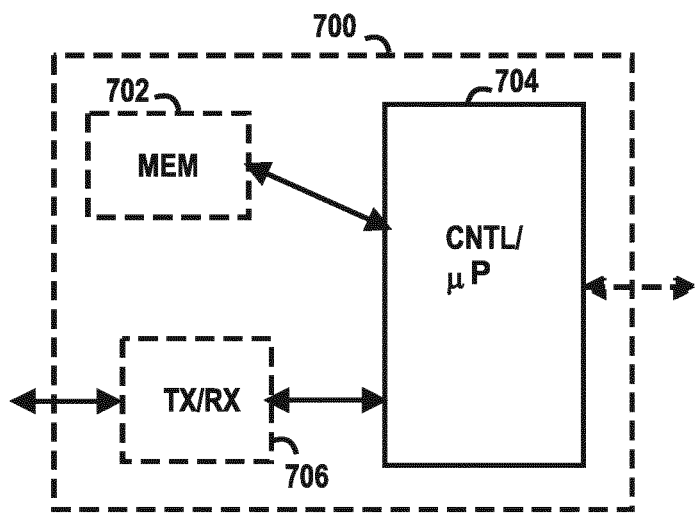
Figure 8:
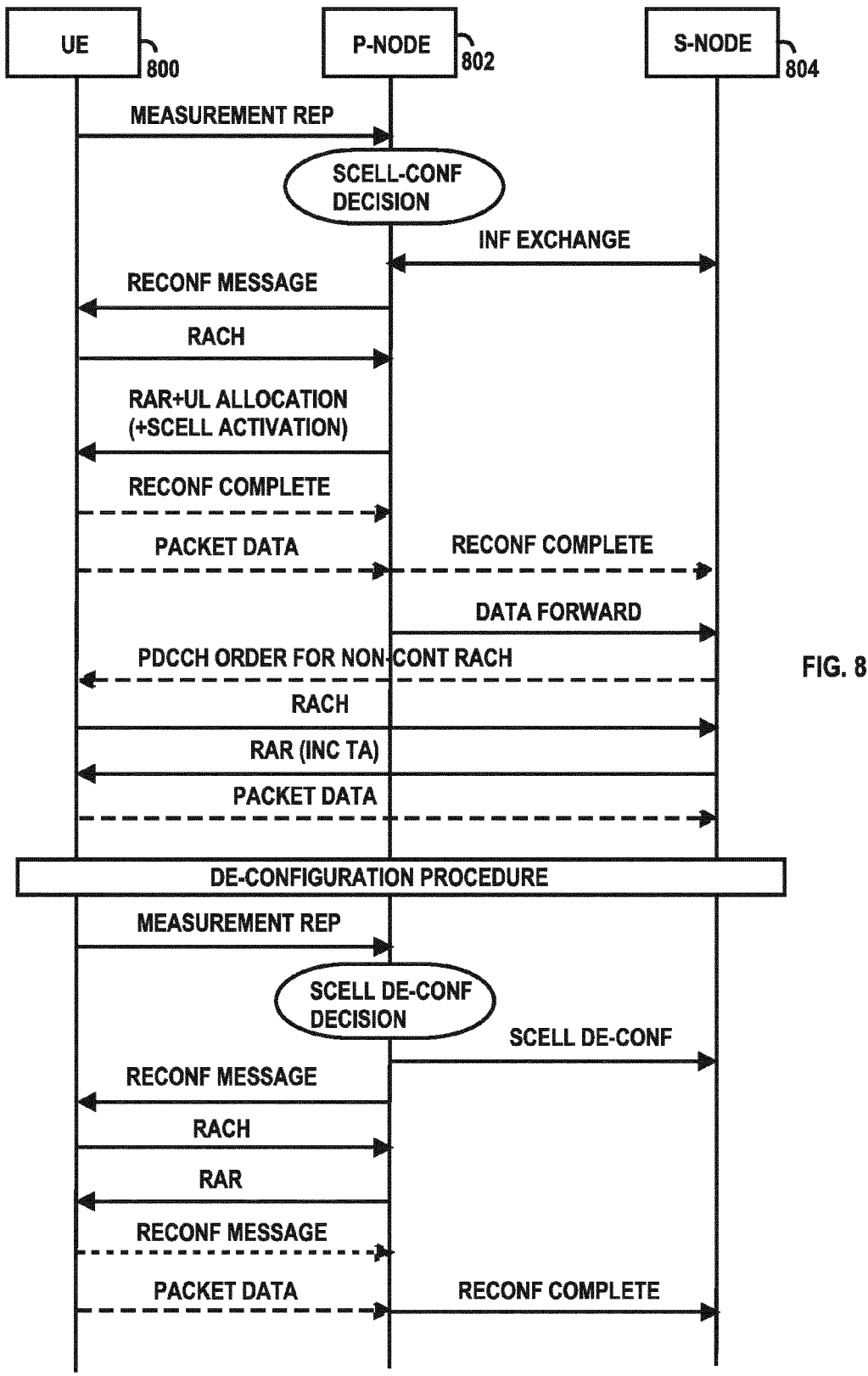

Some embodiments of the present invention are described below, by way of example only, with reference to the accompanying drawings, in which FIG. 1 illustrates examples of systems;
FIG. 2 is a flow chart;
FIG. 3 is another flow chart;
FIG. 4 is yet another flow chart;
FIG. 5 illustrates examples of apparatuses;
FIG. 6 illustrates other examples of apparatuses;
FIG. 7 illustrates yet other examples of apparatuses, and
FIG. 8 illustrates examples of signalling.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution (LTE), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution advanced (LTE-A,), global system for mobile communication (GSM), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a combination of signals on each of the subcarriers. Further, each OFDM symbol is preceded by a cyclic prefix (CP), which is used to decrease Inter-Symbol Interference.

Single-carrier FDMA (SC-FDMA) is a frequency-division multiple access scheme. The SC-FDMA produces a single-carrier transmission signal, in contrast to OFDMA which is a multi-carrier transmission scheme. Unlike in OFDM, SC-FDMA subcarriers are not independently modulated.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, or LTE-Advanced (LTE-A).

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment. Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule downlink transmissions to user devices. Such required information is usually signalled to the (e)NodeB by using uplink signalling.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc. The mobility management entity is a control element in an evolved packet core (EPC).

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM, some examples are a full-size SIM, mini-SIM, micro-SIM and embedded-SIM), including, but not limited to, the following types of devices: a mobile station (mobile phone), smartphone, personal digital assistant (PDA), plug-in data modem (such as a universal serial bus, USB stick), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e)NodeBs of FIG. 1 may provide any kind of these cells. A cellular radio system may be implemented as a multilayer network including several kinds of cells and some of the cells may belong to different radio access technology layers. Typically, in multilayer networks, one node B provides one kind of a cell or cells, and thus a plurality of (e) Node Bs are required to provide such a network structure.

Recently for fulfilling the need for improving the deployment and performance of communication systems, the concept of "plug-and-play" (e)Node Bs has been introduced. Typically, a network which is able to use "plug-and-play" (e)Node (e)Bs, may include, in addition to Home (e)Node Bs (H(e)nodeBs), a home node B gateway, or HNB-GW (not shown in FIG. 1). A HNB Gateway (HNB-GW), which is typically installed within an operator's network may aggregate traffic from a large number of HNBs back to a core network.

Heterogenenous networks "HetNets" are means for expanding mobile network capacity. A heterogeneous network typically comprises devices using multiple radio access technologies, architectures, transmission solutions, etc. The heterogeneous networks may also create challenges due to the deployment of different wireless nodes such as macro/micro (e)NBs, pico (e)NBs, and Home (e)NBs creating a multi-layer network using a same spectrum resource. Usually, centralized network planning and optimization is not well-suited to the individualistic nature of user-deployed cells, such as femtocells. Thus cooperation between nodes in a decentralized and distributed manner may be provided. Cooperative heterogeneous networks are also known as "coHetNets".

Cognitive and re-configurable radios may be a key for obtaining a heterogeneous communication environment where mitigation techniques and cognitive signalling are used for sharing the spectrum and routing information. Spectrum sharing or flexible spectrum usage between different layers or cells of a same radio access network (RAN), between different RANs of a same operator, between different operators, etc., is recognized as a promising method to enhance the usage of available frequency domain resources. One of the basic sources for spectrum sharing gain is provided by large variations of traffic offered to a cell.

Cognitive radios are designed to efficient spectrum use deploying so-called smart wireless devices being capable to sense and detect the environment and adapt to it thus being suitable for opportunistic spectrum usage, in which also the frequency bands not being used by their primary (usually licensed) users may be utilized by secondary users. For this purpose cognitive radios are designed to detect unused spectrum, such as spectrum holes. Alternatively, network may store information about spectrum resources that are available for a secondary usage. The information on spectrum resources may be combined with geo-location of a device, and thus available spectrum resources for the device in this particular location may be defined.

A heterogeneous network typically comprises different types of base station nodes as already described above. When a user device is in the coverage area of both a larger umbrella cell and a small cell, it may be beneficial in some cases to exploit both network layers for transmission to the user device. In such a case, a data stream is split to be transmitted via both the umbrella cell node and the small cell node on separate component carriers. Such downlink data conveyance may be built on LTE-Advanced carrier aggregation (CA) functionality. Carrier aggregation enables operators to create larger "virtual" carrier bandwidths for LTE services by combining separate spectrum allocations. The aggregation provides higher peak data rates and increased average data rates for users. In the carrier aggregation, multiple LTE component carriers (typically LTE Release 8 carriers) are aggregated on the physical layer to provide required bandwidth. The aggregation of component carriers may be carried out at different protocol layers. An LTE user device sees each component carrier as an LTE carrier, whereas an LTE-Advanced user device is able to exploit the aggregated bandwidth as a whole. When carrier aggregation is used, a single radio link control (RLC) protocol entity is usually used per a radio bearer and/or data stream instead of carrier-specific RLC protocol entities.

In the following, some embodiments are disclosed in further details in relation to FIG. 2. Embodiments are related to X2 interface-based inter-site LTE carrier aggregation (CA). When configured with the inter-site CA, a user device is usually coupled to multiple non-collocated eNBs via separate frequency carriers. Additionally, an umbrella cell eNB may control a primary cell (PCell), whereas a small cell eNB may control one or more secondary cells (SCells). A primary cell is a cell which may provide a user device with security control and non-access stratum (NAS) information, such as mobility support and support for session management procedures to establish and maintain Internet Protocol connectivity between the user device and a packet data network gateway (PDN GW). Other serving cells are called secondary serving cells (SCells). Besides a PCell, an umbrella cell eNB (also called as a master eNB) is able to control one or more SCells as well.

An embodiment starts in block 200. The embodiment may be carried out by a node, host or server providing an umbrella cell operating as a primary cell supporting X2 interface-based inter-site carrier aggregation.

In block 202, a radio resource reconfiguration message is conveyed to a user device for carrying out secondary cell configuration for downlink data conveyance using inter-site carrier aggregation functionality.

A radio resource reconfiguration message may be a radio resource control (RRC) message with additional information, such as secondary cell (SCell) system information, pico(micro/femto)-macro switching pattern for uplink (if a user device supports only single-carrier uplink), cell radio network temporary identifier (C-RNTI) used by pico/slave node, and primary cell (PCell) and/or SCell physical uplink control channel (PUCCH) configuration for inter-site carrier aggregation transmission (user devices with different hybrid adaptive repeat and request, (HARQ) timings may otherwise cause PUCCH collisions).

Additionally, it should be appreciated that potential protocol architecture for providing inter-site carrier aggregation may entail functionality for each node to terminate its own RLC bearer(s). Thus the radio resource configuration message may also comprise information on which radio link control (RLC) bearers are associated with which packet data convergence protocol (PDCP) bearers.

In another embodiment, intra- and inter-site physical layer configurations (such as uplink (UL) switching pattern, configuration of PUCCH resources, etc.) may be conveyed to a user device as soon as it enters the coverage area of the umbrella cell in question. It should be understood that separate configurations for each small cell may be provided or a plurality of small cells may share the same configuration. In practice, this may be implemented by introducing SCell pre-configuration. In this case, the radio resource reconfiguration message may be a "simple" activation message (an RRC message or a medium access control (MAC) message).

Additionally, PCell and SCell PUCCH configurations to be used after SCell reconfiguration may also be conveyed in the radio resource reconfiguration message. Potentially, information on operation at a radio link control (RLC)/medium access control (MAC) layer to support inter-site carrier aggregation (such as transmission of an RLC status protocol data unit (PDU) to a specific node) may also be included in the radio resource reconfiguration message.

It should be understood that typically, before a radio resource reconfiguration message is conveyed, a decision to transfer at least part of data conveyance to different resources is made. A decision to configure one or more SCells may be based on mobility measurements. Before the SCell configuration, information exchange between a PCell node and a SCell node may take place, and this may be called reconfiguration preparation. This may comprise conveying cell radio network temporary identifier (C-RNTI), preparing physical resources in SCell node, etc.

In blocks 204 and 206, information on completion of the secondary cell configuration is obtained and/or conveyed and/or downlink data forwarding is activated to a secondary cell node.

A primary node (PCell node) may inform a secondary node (SCell node) about the reconfiguration completion of the SCell (and/or activation, a separate activation message is also an option) in order that the SCell node is able to activate the SCell (if not yet activated by the PCell) and start to schedule a user device on the SCell. This may be carried out after a "completion of the SCell reconfiguration" or "reconfiguration complete" message is obtained from the user device. Alternatively, the PCell node may directly start forwarding downlink data packets from which the SCell node understands that the SCell setup towards the user device is successfully completed. Arrow 210 depicts these options (see also FIG. 8).

In one embodiment, the information on completion of secondary cell configuration may be a radio resource reconfiguration complete message. The message may be conveyed from a user device to a PCell node which may forward the message to an SCell node using X2 interface. Alternatively, the radio resource reconfiguration complete message may be conveyed from the user device to the SCell, which then may forward the information to the PCell. A random access channel procedure (RACH procedure) may be carried out before the information on the completion of the secondary cell configuration is obtained and/or conveyed. It may comprise random access preamble and random access response (RAR). This procedure may be used as a handshake procedure in such a manner that the user device and the primary cell node (PCell node) may synchronously switch to a new physical layer (PHY) configuration. Upon transmission and/or reception of the RAR, the user device and/or PCell node (eNB) may at least partly clear hybrid adaptive repeat and request (HARQ) buffers (needed due to PHY configuration change), whereas upper layer 2 buffers (radio link control (RLC) and/or packet data convergence protocol (PDCP)) may be left untouched.

The embodiment ends in block 208. The embodiment is repeatable in many ways. One example is shown by arrow 212 in FIG. 2.

Another embodiment starts in block 300. The embodiment may be carried out by a node, host or server providing a small cell (pico, femto, micro) operating under a macro cell as a secondary cell supporting X2 interface-based inter-site carrier aggregation.

In block 302, information on completion of a secondary cell configuration is obtained from a primary node or a user device and/or downlink data is obtained from the primary node for downlink data conveyance using inter-site carrier aggregation functionality.

In one embodiment, the information on completion of secondary cell configuration may be a radio resource reconfiguration complete message. The message may be conveyed from a user device to a PCell node which forwards the message to an SCell node using X2 interface. Alternatively, the radio resource reconfiguration complete message may be conveyed from the user device to the SCell, which then forwards the information to the PCell.

A primary node (PCell node) or a user device may inform a secondary node (SCell node) about the reconfiguration completion of the SCell (and/or activation, a separate activation message is also an option) in order that the SCell node is able to activate an SCell (if not yet activated by the PCell node) and start to schedule the user device on the SCell. This may be carried out after completion of the SCell reconfiguration message conveyance to the user device. Alternatively, the PCell node may directly start forwarding downlink data packets from which the SCell node understands that the SCell setup towards the user device is successfully completed.

In block 304, a random access channel procedure is carried out for enabling switching to the configured secondary cell. A random access channel procedure is typically initiated by a user device.

The random access channel procedure (RACH procedure) may comprise a random access preamble and random access response (RAR). This procedure may be used as a handshake procedure in such a manner that a user device and a secondary cell node (SCell node) may synchronously switch to a new physical layer (PHY) configuration. The random access channel procedure between the user device and a primary cell node may be used to synchronously switch to a new PHY configuration. This may comprise exchanging security keys and flushing higher layer (radio link control and or packet data convergence protocol) buffers. The random access channel procedure between the user device and the secondary cell node may be used for user device to obtain timing advance information.

The random access response may comprise a timing advance (TA) parameter. Usually, in the LTE or LTE-Advanced, when a user device requests an RRC connection with a (e)NB, it transmits a random access preamble and the (e)NB estimates the transmission timing of the user device based on the random access preamble. Then the (e)NB transmits a random access response comprising timing advance command based on which the user device adjusts its timing.

In the case a user device supports a dual-carrier uplink and a physical layer PCell configuration is not modified when a SCell is configured and/or activated, no need for a RACH handshake procedure exists. In this case the user device may immediately initiate a non-contention based RACH (the non-contention based random access procedure used for handover and/or downlink data reception in the LTE or LTE-Advanced) to a SCell to obtain uplink timing (either using a RACH preamble indicated in the radio resource reconfiguration message or via a physical downlink control channel (PDCCH) order transmitted directly from the SCell eNB).

The embodiment ends in block 306. The embodiment is repeatable in many ways. One example is shown by arrow 308 in FIG. 3.

Yet another embodiment starts in block 400. The embodiment may be carried out by a user device supporting X2 interface-based inter-site carrier aggregation.

In block 402, a random access channel procedure is carried out for enabling switching to the configured secondary cell and/or a non-contention based random access channel procedure is carried out for obtaining uplink timing for downlink data conveyance using inter-site carrier aggregation functionality.

The random access channel procedure (RACH procedure) may comprise random access preamble and random access response (RAR). This procedure may be used as a handshake procedure in such a manner that a user device and a primary cell node (PCell node) may synchronously switch to a new physical layer (PHY) configuration. Upon transmission and/or reception of the RAR, the user device and/or PCell node (eNB) clears at least partly hybrid adaptive repeat and request (HARQ) buffers (needed due to PHY configuration change), whereas upper layer 2 buffers (radio link control (RLC) and/or packet data convergence protocol (PDCP)) may be left untouched. Thus, the random access channel procedure may be carried out between a user device and a primary cell node.

In one embodiment, a secondary cell (SCell) is either explicitly or implicitly activated with a random access response a user device obtains.

The non-contention based RACH (the non-contention based random access procedure is typically used for handover and/or downlink data reception in the LTE or LTE-Advanced) is used to obtain uplink timing (either using a RACH preamble indicated in the radio resource reconfiguration message or via a physical downlink control channel (PDCCH) order transmitted directly from an SCell eNB). Non-contention-based RACH procedure between a user device and the SCell node may be used to determine timing advance (TA) after which the user device is able to receive and transmit data from/to the SCell.

In the case a user device supports dual-carrier uplink and a physical layer PCell configuration is not modified when a SCell is configured and/or activated, no need for an RACH handshake procedure exists. In this case the user device may immediately initiate a non-contention based RACH. Thus, the non-contention based random access channel procedure may be carried out between a user device and a secondary cell node.

A user device may also obtain a radio resource reconfiguration message from a primary cell. The radio resource reconfiguration message may be a radio resource control message with additional information, such as secondary cell (SCell) system information, pico(micro/femto)-macro switching pattern for uplink (if a user device supports only single-carrier uplink), cell radio network temporary identifier (C-RNTI) used by pico/slave node, and primary cell (PCell) and/or SCell physical uplink control channel (PUCCH) configuration for inter-site carrier aggregation transmission (user devices with different hybrid adaptive repeat and request, (HARQ) timings may otherwise cause PUCCH collisions).

Additionally, it should be appreciated that potential protocol architecture for providing inter-site carrier aggregation may entail functionality for each node to terminate its own RLC bearer(s). Thus the radio resource configuration message may also comprise information on which radio link control (RLC) bearers are associated with which packet data convergence protocol (PDCP) bearers.

The embodiment ends in block 404. The embodiment is repeatable in many ways. One example is shown by arrow 406 in FIG. 4.

In the following, some embodiments are further clarified by means of FIG. 8, which illustrates exemplifying signalling between user device 800, primary cell node 802 and secondary cell node 804.

In the exemplary embodiment(s), the user device 800 transmits one or more measurement reports to the primary cell node 802. A measurement report may comprise corresponding information to an ordinary handover process. The primary cell node makes a decision to configure (and activate) a secondary cell based on the one or more measurement report. The primary cell node 802 and the secondary cell node 804 exchange information to setup inter-site carrier aggregation configuration. The primary cell node transmits a reconfiguration message to the user device and a random access channel procedure with RAR information and uplink activation takes place between the user device and the primary cell node. Then the user device transmits a (re)configuration complete-message to the primary cell node which in turn forwards s a (re)configuration complete-message and/or forwards data packets to the secondary cell node. The secondary cell node carries out a non-contention based RACH procedure comprising RAR and timing information with the user device and/or transmits/receives data packets.

It should be appreciated that the secondary cell configuration may also be cancelled or de-configured. This procedure may also be based on measurement reports the primary cell receives from the user device. The primary cell transmits a de-configuration message to the secondary cell node and a new reconfiguration message to the user device. Then the RACH procedure with RAR between the primary node and the user device takes place. The user device may transmit a reconfiguration complete message to the primary cell node. The primary cell node may transmit a reconfiguration complete message to the secondary cell node or stop transmitting data packets to the secondary cell node. Instead, it may transmit data packets to the user device.

The steps/points, signaling messages and related functions described above in FIGS. 2, 3, 4 (and 8) are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc. on a case by case basis. The same principle may be applied to terms transmission and reception as well.

An embodiment provides an apparatus which may be any relay node, node, host, server or any other suitable apparatus capable to carry out processes described above in relation to FIG. 2.

FIG. 5 illustrates a simplified block diagram of an apparatus according to an embodiment.

As an example of an apparatus according to an embodiment, it is shown apparatus 500, including facilities in control unit 504 (including one or more processors, for example) to carry out functions of embodiments according to FIG. 2. The facilities may be software, hardware or combinations thereof as described in further detail below.

Another example of apparatus 500 may include at least one processor 504 and at least one memory 502 including a computer program code, the at least one memory and the computer program code configured to, with the at least one processor, cause the apparatus at least to: convey a radio resource reconfiguration message to a user device for carrying out secondary cell configuration for downlink data conveyance using inter-site carrier aggregation functionality, and obtain and/or convey information on completion of the secondary cell configuration and/or activate downlink data forwarding to a secondary cell node.

Yet another example of an apparatus comprises means 504 (506) for conveying a radio resource reconfiguration message to a user device for carrying out secondary cell configuration for downlink data conveyance using inter-site carrier aggregation functionality, and means 504 (506) for obtaining and/or conveying information on completion of the secondary cell configuration and/or means 504 (506) for activating downlink data forwarding to a secondary cell node.

Yet another example of an apparatus comprises a conveying unit configured to convey a radio resource reconfiguration message to a user device for carrying out secondary cell configuration for downlink data conveyance using inter-site carrier aggregation functionality, and an obtainer configured to obtain and/or convey information on completion of the secondary cell configuration and/or an activator configured to activate downlink data forwarding to a secondary cell node.

It should be understood that the apparatuses may include or be coupled to other units or modules etc., such as those used in or for transmission and/or reception. This is depicted in FIG. 5 as optional block 506. In FIG. 5, block 506 includes parts/units/modules needed for reception and transmission, usually called a radio front end, RF-parts, radio parts, radio head, etc.

Although the apparatuses have been depicted as one entity in FIG. 5, different modules and memory may be implemented in one or more physical or logical entities.

An embodiment provides an apparatus which may be any relay node, node, host, server or any other suitable apparatus capable to carry out processes described above in relation to FIG. 3.

FIG. 6 illustrates a simplified block diagram of an apparatus according to an embodiment.

As an example of an apparatus according to an embodiment, it is shown apparatus 600, including facilities in control unit 604 (including one or more processors, for example) to carry out functions of embodiments according to FIG. 3. The facilities may be software, hardware or combinations thereof as described in further detail below.

Another example of apparatus 600 may include at least one processor 604 and at least one memory 602 including a computer program code, the at least one memory and the computer program code configured to, with the at least one processor, cause the apparatus at least to: obtain information on completion of a secondary cell configuration from a primary node or a user device and/or downlink data from the primary node for downlink data conveyance using inter-site carrier aggregation functionality, and carry out a random access channel procedure for enabling switching to the configured secondary cell.

Yet another example of an apparatus comprises means 604 (606) for obtaining information on completion of a secondary cell configuration from a primary node or a user device and/or downlink data from the primary node for downlink data conveyance using inter-site carrier aggregation functionality, and means 604 (606) for carrying out a random access channel procedure for enabling switching to the configured secondary cell.

Yet another example of an apparatus comprises an obtainer configured to obtain information on completion of a secondary cell configuration from a primary node or a user device and/or downlink data from the primary node for downlink data conveyance using inter-site carrier aggregation functionality, and switching unit configured to carrying out a random access channel procedure for enabling switching to the configured secondary cell.

It should be understood that the apparatuses may include or be coupled to other units or modules etc., such as those used in or for transmission and/or reception. This is depicted in FIG. 6 as optional block 606. In FIG. 6, block 606 includes parts/units/modules needed for reception and transmission, usually called a radio front end, RF-parts, radio parts, radio head, etc.

Although the apparatuses have been depicted as one entity in FIG. 6, different modules and memory may be implemented in one or more physical or logical entities.

An embodiment provides an apparatus which may be any user device, relay node, or any other suitable apparatus capable to carry out processes described above in relation to FIG. 4.

FIG. 7 illustrates a simplified block diagram of an apparatus according to an embodiment.

As an example of an apparatus according to an embodiment, it is shown apparatus 700, including facilities in control unit 704 (including one or more processors, for example) to carry out functions of embodiments according to FIG. 4. The facilities may be software, hardware or combinations thereof as described in further detail below.

Another example of apparatus 700 may include at least one processor 704 and at least one memory 702 including a computer program code, the at least one memory and the computer program code configured to, with the at least one processor, cause the apparatus at least to: carry out a random access channel procedure for enabling switching to a configured secondary cell for downlink data conveyance using inter-site carrier aggregation functionality, and/or carry out a non-contention based random access channel procedure for obtaining uplink timing for downlink data conveyance using inter-site carrier aggregation functionality.

Yet another example of an apparatus comprises means 704 (706) for carrying out a random access channel procedure for enabling switching to a configured secondary cell for downlink data conveyance using inter-site carrier aggregation functionality, and/or means 704 (706) for carrying out a non-contention based random access channel procedure for obtaining uplink timing for downlink data conveyance using inter-site carrier aggregation functionality.

Yet another example of an apparatus comprises a switching unit configured to carry out a random access channel procedure for enabling switching to a configured secondary cell for downlink data conveyance using inter-site carrier aggregation functionality, and/or signalling unit configured to carry out a non-contention based random access channel procedure for obtaining uplink timing for downlink data conveyance using inter-site carrier aggregation functionality.

It should be understood that the apparatuses may include or be coupled to other units or modules etc., such as those used in or for transmission and/or reception. This is depicted in FIG. 7 as optional block 706. In FIG. 7, block 706 includes parts/units/modules needed for reception and transmission, usually called a radio front end, RF-parts, radio parts, radio head, etc.

Although the apparatuses have been depicted as one entity in FIG. 7, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be at least one software application, module, or unit configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   convey, by a primary cell node, a radio resource reconfiguration message to a user device for carrying out secondary cell configuration for downlink data conveyance using inter-site carrier aggregation functionality, wherein the inter-site aggregation functionality comprises the user device being provided with a frequency carrier by the primary cell node and with another frequency carrier by a secondary cell node; and
   obtain and/or convey information on completion of the secondary cell configuration and/or
   activate downlink data forwarding to the secondary cell node.

2. The apparatus of claim 1, further comprising causing the apparatus to:
   provide an umbrella cell operating as a primary cell supporting X2 interface-based inter-site carrier aggregation.

3. The apparatus of claim 1, wherein the radio resource reconfiguration message is a radio resource control (RRC) message comprising at least one of secondary cell system information, pico(micro/femto)-macro cell switching pattern for uplink, cell radio network temporary identifier (C-RNTI) used by pico/slave node, primary cell physical uplink control channel configuration and secondary cell physical uplink control channel configuration.

4. The apparatus of claim 1, wherein the radio resource reconfiguration message is an activation message of radio resource control or medium access control type.

5. The apparatus of claim 1, further comprising causing the apparatus to:
   convey as a part of the radio resource reconfiguration message primary cell and/or secondary cell physical uplink control channel configurations to be used after the secondary cell configuration.

6. An apparatus comprising:
   at least one processor and at least one memory including a computer program code, the at least one memory and the computer program code configured to, with the at least one processor, cause the apparatus at least to:
   obtain information on completion of a secondary cell configuration from a primary cell node or a user device and/or downlink data from the primary cell node for downlink data conveyance using inter-site carrier aggregation functionality, wherein the inter-site aggregation functionality comprises the user device being provided with a frequency carrier by the primary cell node and with another frequency carrier by a secondary cell node; and
   carry out a random access channel procedure for enabling switching to the configured secondary cell.

7. The apparatus of claim 6, further comprising causing the apparatus to:
   provide a small cell operating under a macro cell as a secondary cell supporting X2 interface -based inter-site carrier aggregation.

8. The apparatus of claim 6, wherein the information on the completion of the secondary cell configuration is a radio resource reconfiguration complete message.

9. The apparatus of claim 6, wherein the random access channel (RACH) procedure comprises a random access preamble and a random access response (RAR).

10. The apparatus of claim 6, wherein the random access channel (RACH) procedure comprises a random access preamble and a random access response (RAR) and wherein the random access procedure is used to switch to a physical layer (PHY) configuration supporting the usage of the secondary cell.

11. The apparatus of claim 6, wherein the information on completion of a secondary cell configuration is obtained from the primary cell node or a user device.

12. An apparatus comprising:
    at least one processor and at least one memory including a computer program code, the at least one memory and the computer program code configured to, with the at least one processor, cause the apparatus at least to:
    carry out a random access channel procedure for enabling switching from a primary cell node to a configured secondary cell for downlink data conveyance using inter-site carrier aggregation functionality, wherein the inter-site aggregation functionality comprises the user device being provided with a frequency carrier by the primary cell node and with another frequency carrier by a secondary cell node; and/or
    carry out a non-contention based random access channel procedure for obtaining uplink timing for downlink data conveyance using inter-site carrier aggregation functionality.

13. The apparatus of claim 12, wherein the random access channel (RACH) procedure comprises a random access preamble and a random access response (RAR).

14. The apparatus of claim 12, further comprising causing the apparatus to:
    clear hybrid adaptive repeat and request (HARD) buffers at least partly.

15. The apparatus of claim 12, wherein the uplink timing is obtained by using a random access channel preamble or via a physical downlink control channel (PDCCH) order.

16. The apparatus of claim 12, further comprising causing the apparatus to:

obtain a radio resource reconfiguration message from the primary cell node, the radio resource reconfiguration message being a radio resource control (RRC) message comprising at least one of secondary cell system information, pico(micro/femto)-macro cell switching pattern for uplink, cell radio network temporary identifier (C-RNTI) used by pico/slave node, primary cell physical uplink control channel configuration and secondary cell physical uplink control channel configuration.

17. A method comprising:
conveying, by a primary cell node, a radio resource reconfiguration message to a user device for carrying out secondary cell configuration for downlink data conveyance using inter-site carrier aggregation functionality, wherein the inter-site aggregation functionality comprises the user device being provided with a frequency carrier by the primary cell node and with another frequency carrier by a secondary cell node; and
obtaining and/or convey information on completion of the secondary cell configuration and/or
activating downlink data forwarding to the secondary cell node.

18. The method of claim 17, further comprising:
providing an umbrella cell operating as a primary cell supporting X2 interface-based inter-site carrier aggregation.

19. The method of claim 17, wherein the radio resource reconfiguration message is a radio resource control (RRC) message comprising at least one of: secondary cell system information, pico(micro/femto)-macro cell switching pattern for uplink, cell radio network temporary identifier (C-RNTI) used by pico/slave node, primary cell physical uplink control channel configuration and secondary cell physical uplink control channel configuration.

20. The method of claim 17, wherein the radio resource reconfiguration message is an activation message of radio resource control or medium access control type.

21. The method of claim 17, further comprising:
conveying as a part of the radio resource reconfiguration message primary cell and/or secondary cell physical uplink control channel configurations to be used after the secondary cell configuration.

22. A method comprising:
obtaining information on completion of a secondary cell configuration from a primary cell node or a user device and/or downlink data from the primary cell node for downlink data conveyance using inter-site carrier aggregation functionality, wherein the inter-site aggregation functionality comprises the user device being provided with a frequency carrier by the primary cell node and with another frequency carrier by a secondary cell node; and
carrying out a random access channel procedure for enabling switching to the configured secondary cell.

23. The method of claim 19, further comprising:
providing a small cell operating under a macro cell as a secondary cell supporting X2 interface -based inter-site carrier aggregation.

24. The method of claim 22, wherein the information on the completion of the secondary cell configuration is a radio resource reconfiguration complete message.

25. The method of claim 22, wherein the random access channel (RACH) procedure comprises a random access preamble and a random access response (RAR).

26. The method of claim 22, wherein the random access channel (RACH) procedure comprises a random access preamble and a random access response (RAR) and wherein the random access procedure is used to switch to a physical layer (PHY) configuration supporting the usage of the secondary cell.

27. The method of claim 22, wherein the information on completion of a secondary cell configuration is obtained from the primary cell node or a user device.

28. A method comprising:
carrying out a random access channel procedure for enabling switching from a primary cell node to a configured secondary cell for downlink data conveyance using inter-site carrier aggregation functionality, wherein the inter-site aggregation functionality comprises the user device being provided with a frequency carrier by the primary cell node and with another frequency carrier by a secondary cell node; and/or
carrying out a non-contention based random access channel procedure for obtaining uplink timing for downlink data conveyance using inter-site carrier aggregation functionality.

29. The method of claim 28, wherein the random access channel (RACH) procedure comprises a random access preamble and a random access response (RAR).

30. The method of claim 28, further comprising:
clearing hybrid adaptive repeat and request (HARQ) buffers at least partly.

31. The method of claim 28, wherein the uplink timing is obtained by using a random access channel preamble or via a physical downlink control channel (PDCCH) order.

32. The method of any claim 28, further comprising:
obtaining a radio resource reconfiguration message from a primary cell, the radio resource reconfiguration message being a radio resource control (RRC) message comprising at least one of: secondary cell system information, pico(micro/femto)-macro cell switching pattern for uplink, cell radio network temporary identifier (C-RNTI) used by pico/slave node, primary cell physical uplink control channel configuration and secondary cell physical uplink control channel configuration.

* * * * *

UNITED STATES PATENT AND TRADEMARK OFFICE
CERTIFICATE OF CORRECTION

PATENT NO.       : 9,516,627 B2                                                        Page 1 of 1
APPLICATION NO.  : 14/377554
DATED            : December 6, 2016
INVENTOR(S)      : Rosa et al.

It is certified that error appears in the above-identified patent and that said Letters Patent is hereby corrected as shown below:

In the Claims

Claim 14, Column 16, Line 61 "(HARD)" should be deleted and --(HARQ)-- should be inserted.

Claim 32, Column 18, Line 44 "a primary cell" should be deleted and --the primary cell node-- should be inserted.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*